United States Patent
Lection et al.

(10) Patent No.: US 9,838,495 B2
(45) Date of Patent: Dec. 5, 2017

(54) MANAGING DATA ACQUISITION

(71) Applicant: INTERNATIONAL BUSINESS MACHINES CORPORATION, Armonk, NY (US)

(72) Inventors: David B. Lection, Raleigh, NC (US); Mark B. Stevens, Austin, TX (US); John D. Wilson, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 14/691,887

(22) Filed: Apr. 21, 2015

(65) Prior Publication Data
US 2016/0316036 A1 Oct. 27, 2016

(51) Int. Cl.
*H04L 29/08* (2006.01)
*H04W 4/00* (2009.01)
*H04W 84/18* (2009.01)

(52) U.S. Cl.
CPC .......... *H04L 67/2828* (2013.01); *H04L 67/18* (2013.01); *H04W 4/006* (2013.01); *H04W 84/18* (2013.01)

(58) Field of Classification Search
CPC .... H04L 67/2828; H04L 67/18; H04W 4/006; H04W 84/18
See application file for complete search history.

(56) References Cited

U.S. PATENT DOCUMENTS

| 7,721,020 | B2 | 5/2010 | Srinivasan |
| 7,936,732 | B2 | 5/2011 | Ho et al. |
| 8,526,329 | B2 | 9/2013 | Mahaney et al. |

(Continued)

FOREIGN PATENT DOCUMENTS

| EP | 2518943 B1 | 10/2012 |
| WO | 03017678 A1 | 2/2003 |

(Continued)

OTHER PUBLICATIONS

"List of IBM Patents or Patent Applications Treated as Related" dated Apr. 13, 2016, including U.S. Appl. No. 14/833,466, filed Aug. 24, 2015; U.S. Appl. No. 14/691,713, filed Apr. 21, 2015; and U.S. Appl. No. 14/929,472, filed Nov. 2, 2015.

(Continued)

*Primary Examiner* — Kim T Nguyen
(74) *Attorney, Agent, or Firm* — Paul S. Drake

(57) ABSTRACT

A system or computer usable program product for efficiently acquiring data from a plurality of proximate devices including a mobile ad-hoc network (manet); selecting one of the mobile devices as a harvest node to transmit data to a repository for storing data; responsive to detecting a first data stream and a second data stream from a respective first mobile device and a second mobile device, determining that the data from the first and second data streams have a threshold similarity; utilizing a node in the manet to compress portions of the first data stream and the second data stream to produce a compressed data stream according to a first compression technique, wherein data from the first data stream and the second data stream are present in the compressed data stream; and transmitting the compressed data stream to the repository by the harvest node.

14 Claims, 9 Drawing Sheets

(56) References Cited

U.S. PATENT DOCUMENTS

| | | | |
|---|---|---|---|
| 2007/0185688 A1 | 8/2007 | Yamamura | |
| 2012/0278430 A1 | 11/2012 | Lehane et al. | |
| 2013/0275170 A1 | 10/2013 | Kern et al. | |
| 2014/0018097 A1* | 1/2014 | Goldstein | G06F 19/3406 455/456.1 |
| 2014/0067938 A1 | 3/2014 | Boldyrev et al. | |
| 2014/0258249 A1* | 9/2014 | Ozturk | G06F 17/30153 707/693 |

FOREIGN PATENT DOCUMENTS

| | | |
|---|---|---|
| WO | 2007099327 A3 | 7/2007 |
| WO | 2013126784 A2 | 8/2013 |
| WO | 2014045155 | 3/2014 |

OTHER PUBLICATIONS

U.S. Appl. No. 14/833,466, filed Aug. 24, 2015.
U.S. Appl. No. 14/691,713, filed Apr. 21, 2015.
U.S. Appl. No. 14/929,472, filed Nov. 2, 2015.
"Mobile Ad hoc Networking (MANET): Routing Protocol Performance Issues and Evaluation Considerations", Jan. 1, 1999, published on IP.com by the Internet Society, IPCOM000003084D.
"The Dynamic Source Routing Protocol (DSR) for Mobile Ad Hoc Networks for IPv4", Feb. 1, 2007, published on IP.com by the IETF Trust, IPCOM000146278D.
"Adaptive data acquisition strategies for energy-efficient, smartphone-based, continuous processing of sensor Streams", May 24, 2012, Lim et al., Distrib. Parallel Databases (2013) 31:321-351.
"Medusa: A Programming Framework for Crowd-Sensing Applications", Jun. 25-29, 2012, Mobisys 2012, Proceedings of the 10th International Conference on Mobile Systems, Applications, and Services, pp. 337-350, ACM, Ra et al., found on the internet at: http://csce.uark.edu/~tingxiny/courses/5013spring13/readingList/Ra12a.pdf.
"Crowdsourcing to Smartphones: Incentive Mechanism Design for Mobile Phone Sensing", Aug. 22-26, 2012, Mobicom 2012, Proceedings of the 18th Annual International Conference on Mobile Computing and Networking, pp. 173-184, ACM, Yang et al., found on the internet at: https://optimization.asu.edu/papers/XUE-CNF-2012-MOBICOM-MPSensing.pdf.
"Secure Crowdsourcing-based Cooperative Spectrum Sensing", Apr. 14-19, 2013, INFOCOM, 2013 Proceedings IEEE, pp. 2526-2534, Zhang et al., found on the internet at: http://cnsg.asu.edu/files/rui-INFOCOM13.pdf.
"Scalable Crowd-Sourcing of Video from Mobile Devices", Jun. 25-28, 2013, Mobisys 2013, Proceedings of the 11th International Conference on Mobile Systems, Applications, and Services, pp. 139-152, Simoens et al., found on the internet at: http://elijah.cs.cmu.edu/DOCS/CMU-CS-12-147.pdf.
"Combining content-based analysis and crowdsourcing to improve user interaction with zoomable video", Nov. 28 to Dec. 1, 2011, Multimedia 2011, Proceedings of the 19th ACM international conference on Multimedia, pp. 43-52, Carlier et al, found on the internet at: http://www.comp.nus.edu.sg/~ooiwt/papers/mm11-zoom-ui.pdf.
"CrowdSearch: exploiting crowds for accurate real-time image search on mobile phones" Jun. 15-18, 2010, Mobisys 2010, Proceedings of the 8th International Conference on Mobile Systems, Applications, and Services, pp. 77-90, ACM, Yan et al, found on the internet at: http://people.cs.umass.edu/~dganesan/papers/MobiSys10-CrowdSearch.pdf.
"Coping with irregular spatio-temporal sampling in sensor networks", Jan. 1, 2003, Ganesan et al., found on the Internet at: http://escholarship.org/uc/item/7vd51134.
"On tile assignment for region-of-interest video streaming in a wireless LAN", Jun. 7-8, 2012, NOSSDAV 2012, Proceedings of the 22nd international workshop on Network and Operating System Support for Digital Audio and Video, pp. 59-64, Ravindra et al, found on the Internet at: http://www.comp.nus.edu.sg/~ooiwt/papers/nossdav12-roi.pdf.
"Efficient Temporal Compression in Wireless Sensor Networks", Oct. 4-7, 2011, 36th Annual IEEE Conference on Local Computer Networks, Yao Liang, found on the internet at: file:///C:/Users/Paul/Downloads/Liang%20LCN2011.pdf.
Sedaghat et al., "Detecting spatio-temporal outliers in crowdsourced bathymetry data," Proceedings of the Second ACM SIGSPATIAL International Workshop on Crowdsourced and Volunteered Geographic Information, Nov. 2013, Orlando, FL, pp. 55-62.
Yi et al., "Semi-Crowdsourced Clustering: Generalizing Crowd Labeling by Robust Distance Metric Learning," Dec. 2012, Neural Information Processing Systems Conference, Lake Tahoe, NV, 9 pages.
Willett et al., "Identifying Redundancy and Exposing Provenance in Crowdsourced Data Analysis," IEEE Transactions on Visualization and Computer Graphics, vol. 19, Issue 12, Dec. 2013, 9 pages.

* cited by examiner

MANAGING DATA ACQUISITION

BACKGROUND

1. Technical Field

The present invention relates generally to efficiently acquiring data, and in particular, to a computer implemented method for efficiently acquiring data from a plurality of proximate devices.

2. Description of Related Art

With the proliferation of mobile devices, the amount of data being collected by individuals has increased exponentially. This includes photos and video as well as other types of data collection such as traffic congestion, weather information, gas prices, etc. Due to the amount of data being collected by users on their mobile devices and the limited amount of data storage available on each mobile device, information may be uploaded from these mobile devices to data storage servers. This uploaded data may be stored in centralized servers in discrete bundles or across multiple servers (and often locations) as cloud storage managed by a hosting company. This allows the user to access the uploaded data at a later time, often from other devices than the device used to capture the uploaded data.

SUMMARY

The illustrative embodiments provide a system and computer usable program product for efficiently acquiring data from a plurality of proximate devices including a mobile ad-hoc network (manet); selecting one of the mobile devices as a harvest node to transmit data to a repository for storing data; responsive to detecting a first data stream and a second data stream from a respective first mobile device and a second mobile device, determining that the data from the first and second data streams have a threshold similarity; utilizing a node in the manet to compress portions of the first data stream and the second data stream to produce a compressed data stream according to a first compression technique, wherein data from the first data stream and the second data stream are present in the compressed data stream; and transmitting the compressed data stream to the repository by the harvest node.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized for efficiently acquiring data from a plurality of proximate devices. These processes and apparatuses may be implemented and utilized as will be explained with reference to the various embodiments below.

Figure 1:
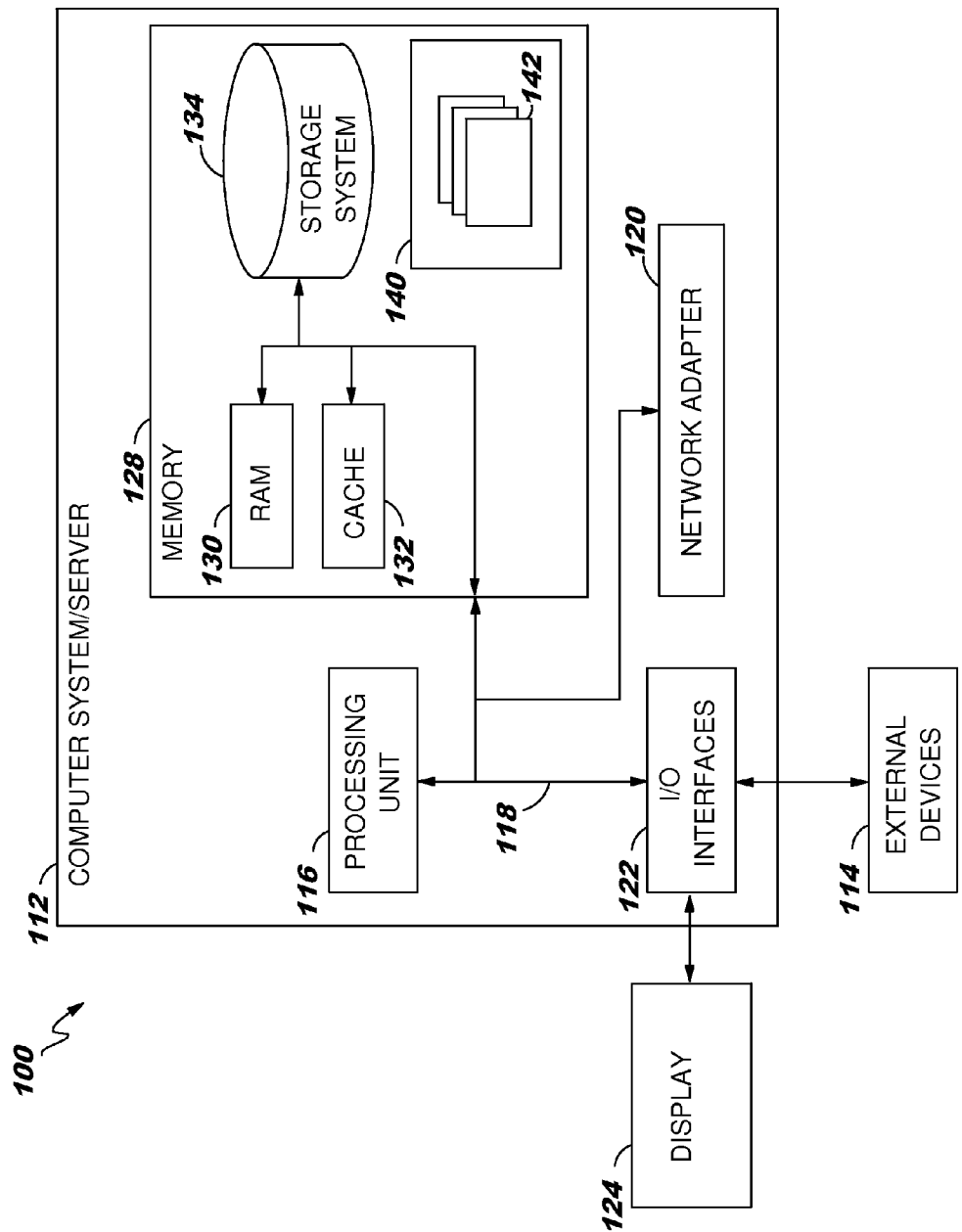
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as efficiently acquiring data from a plurality of proximate devices.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for efficiently acquiring data from a plurality of proximate devices.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
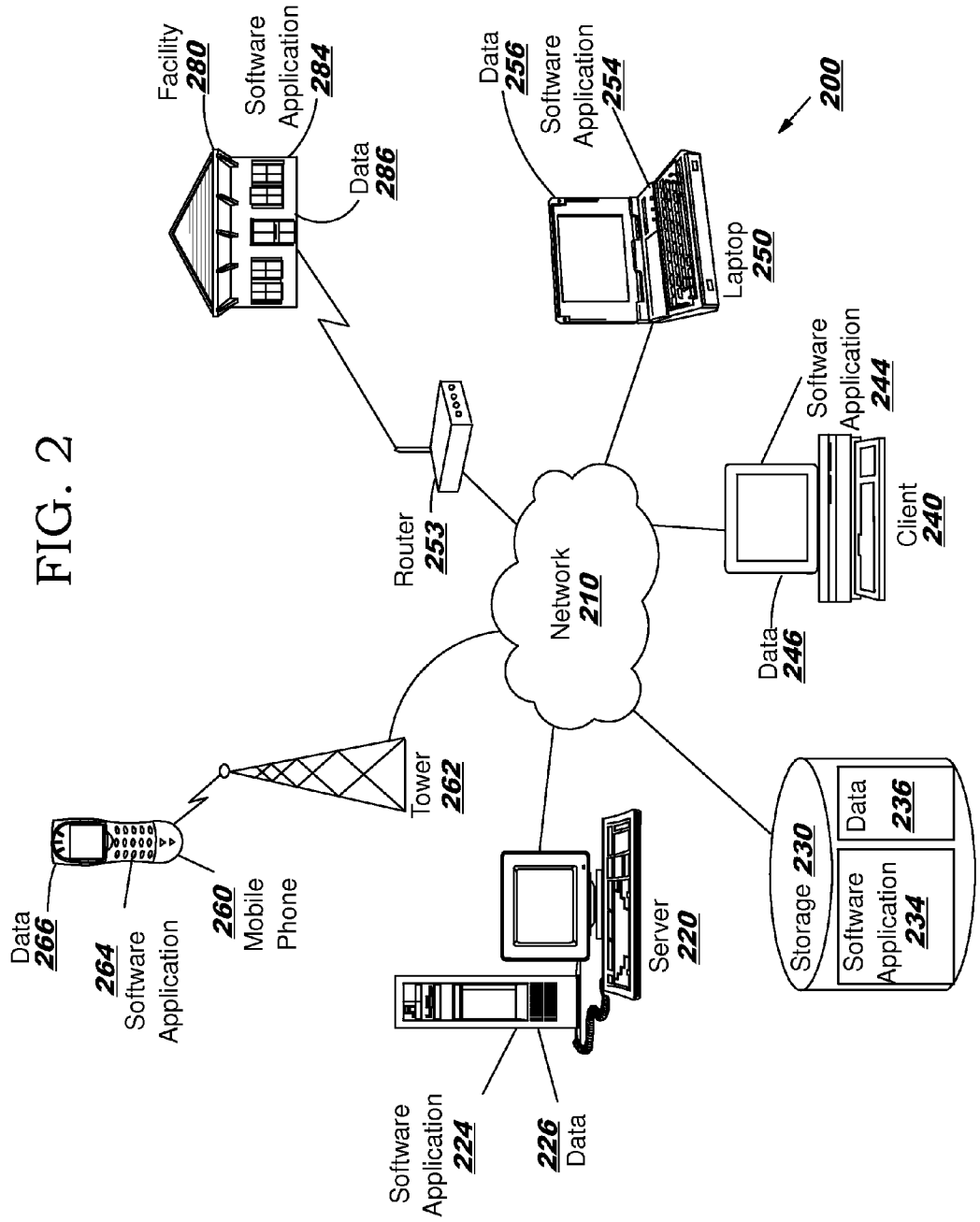
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for efficiently acquiring data from a plurality of proximate devices may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for efficiently acquiring data from a plurality of proximate devices or other software applications and data in accordance with embodiments described herein. Storage 230 may contain software application 234 and a content source such as data 236 for efficiently acquiring data from a plurality of proximate devices. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for efficiently acquiring data from a plurality of proximate devices.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
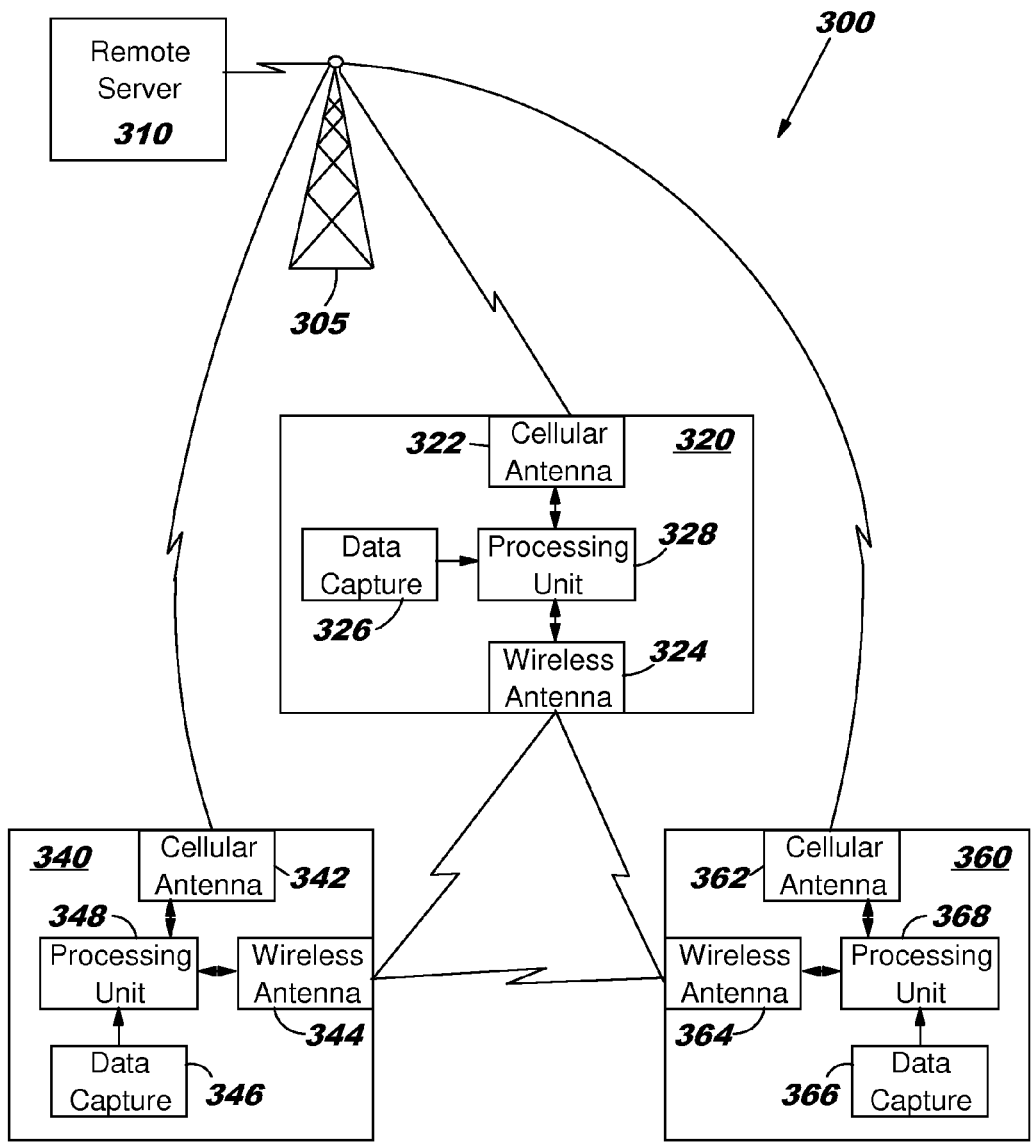
FIG. 3 is a block diagram of three mobile devices utilizing one of the mobile devices to upload data to a repository in which various embodiments may be implemented.

FIG. 3 is a block diagram 300 of three mobile devices utilizing one of the mobile devices to upload data to a repository in which various embodiments may be implemented. Three mobile devices 320, 340 and 360 can communicate through a cellular tower 305 with a remote server 310, the server including a repository for storing mobile device data. These mobile devices can be mobile phones, laptops, or other types of mobile devices. Although a cellular communication is shown, alternative embodiments may utilize other types of communications such as wireless LAN, near field communications, optical, infrared, etc. In this example, this cellular communication of each mobile device is through cellular antennae 322, 342 and 362. Each of the mobile devices also communicates directly with each other through wireless antennae 324, 344 and 364. Although a wireless communication is shown, alternative embodiments may utilize other types of communications such as cellular, optical, infrared, near field wireless communications, etc. In an alternative embodiment, the same type of communication and same antennae may be utilized for communicating with server 310 and with the other mobile devices (e.g., wireless LAN). Server 310 may be a single server, it may be multiple servers implementing a cloud storage repository application, or it may be another type of data collection repository.

In this example, mobile device 320 is a harvest node which provides data captured by each of the mobile devices to the server through cellular tower 305. Mobile devices 340 and 360 are the supplier nodes and may not need a connection with the server, although such connections may be established for assisting in identifying proximate mobile devices with similar data uploads to server 310 for storage in the repository. In addition, a wireless connection may not be needed between supplier nodes 340 and 360 (mobile devices 340 and 360), although such a connection may be helpful in coordinating data transmission to harvest node 320. Harvest node 320 may also be a supplier node.

Each mobile device captures data through data capture device 326, 346 and 366. The data capture devices may be a still camera, a video camera, a microphone, a heat sensor, a location sensor (e.g., global positioning position or GPS device), or other type of sensor for capturing data. This captured data is provided internally to a processing unit 328, 348 or 368 for processing and external transmission. The processing can include data management (e.g., image stabilization), data compression, or other type of data processing. The processing also includes transmitting the data through an antenna to a receiving device. For mobile devices 340 and 360, the data can be transmitted to mobile device (harvest node) 320. Harvest node 320 then combines the data and can utilize additional data compression techniques before transmitting all three sets of captured data to server 310 through cellular tower 305. Each mobile device can include other types of devices such as memory, graphics processors, etc.

Several methods can be implemented for combining and compressing the captured data for transmission. For example, if each of the mobile devices is capturing video of a concert in near proximity of each other, then the images may be quite similar. This similarity can be utilized to further compress the captured data. A common general technique for compressing image (or other similar data) is to send a first frame of image data with standard image compression, then send the second frame by only transmitting differences from the first frame of image data. The second frame of image data can then be constructed by taking the previously transmitted first frame of data and then applying the differences as transmitted as the second frame of image data. Similar techniques could be utilized for combining frames of data from proximate mobile devices. For example, each mobile device may be utilizing a video camera to capture the same images (e.g., a concert) from slightly different angles. As a result, the images may be quite similar. Other type of data compression can be utilized, either alternatively or in combination with the aforementioned technique. Other types of compression may be utilized with other types of data.

In a first embodiment, mobile devices 340 and 360 may send their captured data (e.g., frames of image data) to harvest node 320 across a wireless connection. Harvest node 320 can then transmit the first frame of its own image data with standard compression, then transmit the first frame of mobile device 340 as differences from the first frame of harvest node 320, then transmit the first frame of mobile device 360 as differences from the first frame of harvest node 320. This could include utilizing headers with each frame of data to ensure that each frame of data is handled properly by remote server 310 for storage in a repository. Many other types of compression techniques could be utilized. For example, if mobile device 360 is closer to mobile device 340 than mobile device 360, it may be more efficient to transmit mobile device 360 image data as a difference from mobile device 340 image data, instead of a difference from harvest node 320 image data. These changes in how the data compression is performed can be dynamic and can vary as the captured data is transmitted.

In a second embodiment, mobile device (harvest node) 320 may transmit wirelessly its captured data (e.g., frames of image data) to mobile devices 340 and 360. Mobile devices 340 and 360 can then compare their captured images to the images from mobile device 320 and generate the differences in a compressed format. Those differences can then be transmitted wirelessly back to mobile device 320 for subsequent cellular transmission to remote server 310 by the harvest node. This approach can increase the amount of wireless transmission (depending on the number of mobile devices and the amount of data compression) while spreading the processing load among multiple mobile devices.

These two embodiments are described in greater detail below. Alternative embodiments can be utilized in collecting, compressing and uploading captured data to a remote server repository or other data collection repository system.

Alternative types of data may be captured, collected, compressed and uploaded or otherwise acquired using the same principles described herein.

Figure 4A:
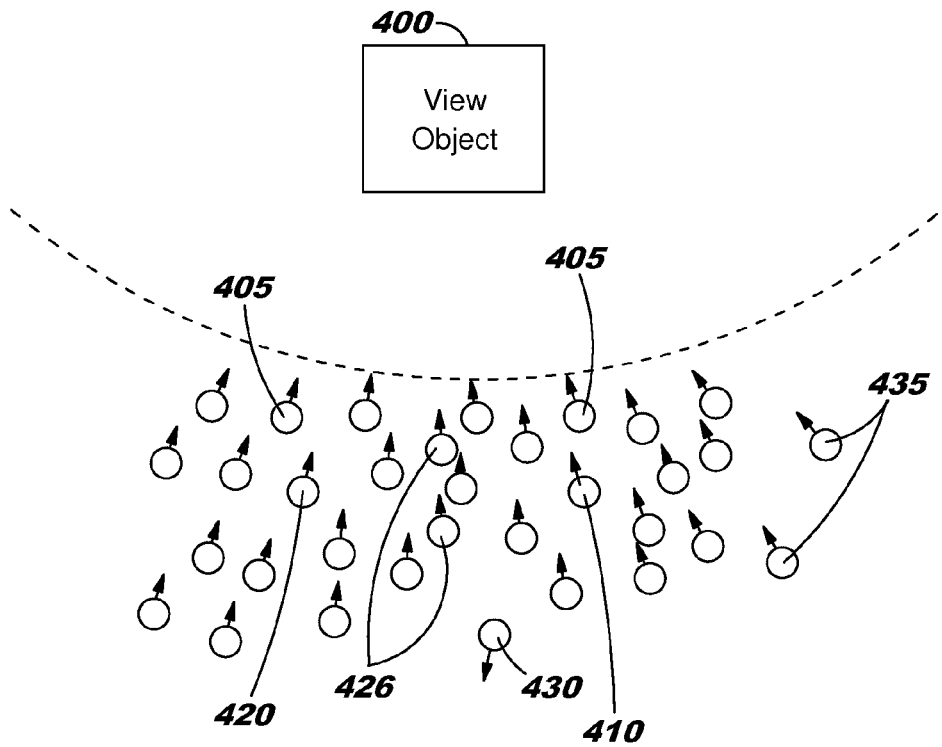
FIGS. 4A and 4B are diagrams of identifying harvest nodes among a set of mobile devices in which various embodiments may be implemented.
Figure 4B:
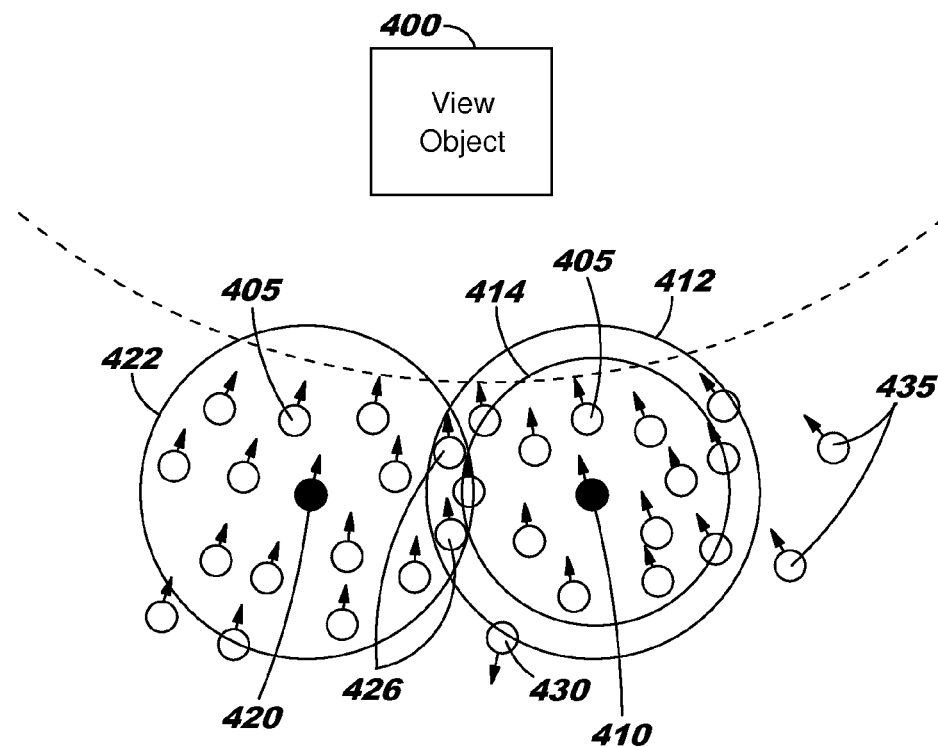

FIGS. 4A and 4B are diagrams of identifying harvest nodes among a set of mobile devices in which various embodiments may be implemented. In this example, multiple mobile devices are concurrently performing a video recording of a view object (e.g., a music concert or public play) and streaming or otherwise uploading each of their videos to a remote server. Although video streaming is described in this example, other types of data capture can be performed such as air quality sampling or motion sensing during an earthquake. As shown in FIG. 4A, multiple mobile devices 405 are recording the same view object 400, but from slightly different angles as indicated with the arrows. As a result, the mobile devices may benefit from joint compression of their video data to reduce the amount of data that needs to be uploaded to the remote server concurrently. However, one mobile device 430 not aimed at the view object. As a result, the recording of mobile device 430 is very different from the other mobile devices and would likely not benefit from joint data compression.

Each of the mobile devices can be in contact with a remote server through a cellular tower, a Wi-Fi network, or other type of communication device. Each of the mobile devices can also be directly in contact with other nearby mobile devices through various types of near field of local wireless communications such as Bluetooth. The mobile devices can then be organized into multiple Mobile Ad Hoc Networks (MANET) for collecting, combining, compressing, and uploading the various video data streams. This organization process can be managed by the remote server or it can be self-organized by the mobile devices.

For illustrative purposes, in this example a single mobile device may be able to combine and upload collected data from 14 different mobile devices. As a result, two centralized mobile devices 410 and 420 are selected as harvest nodes as shown in FIG. 4B. Each harvest node may have an initial communication range 412 and 422 for collecting data from other mobile devices. This communication range may be based on the distance that a mobile device may be able to communicate directly with other nearby mobile device, the number of mobile devices that can be communicated with, or other factors. This communication range may also be modified based on the number of mobile devices within that range or to reduce overlap with another harvest node range. In this example, initial communication ranges 412 and 422 overlap. Since range 412 contains more mobile devices than range 422, the communication range for harvest node 410 is reduced to communication range 414, thereby reducing overlap. As a result, mobile device 426 were previously within the communication range of both harvest nodes 410 and 420, but now are only within the communication range of mobile device 420 due to the range size reduction of harvest node 410. Although the communication ranges shown are circular, other shapes may be utilized such as ellipsoid, oval, etc. and may be based on antenna shape and position or other factors.

Mobile devices 430 and 435 are not included in any harvest node communication range and may upload their collected data separately. This can occur due to limitations of the selected harvest nodes (e.g., limited range or limited number of devices which can be organized therewith), due to a large variation in video images such as distance from the view object, or other considerations. Alternatively, non-organized mobile devices can be organized with additional harvest nodes to be selected.

Figure 5:
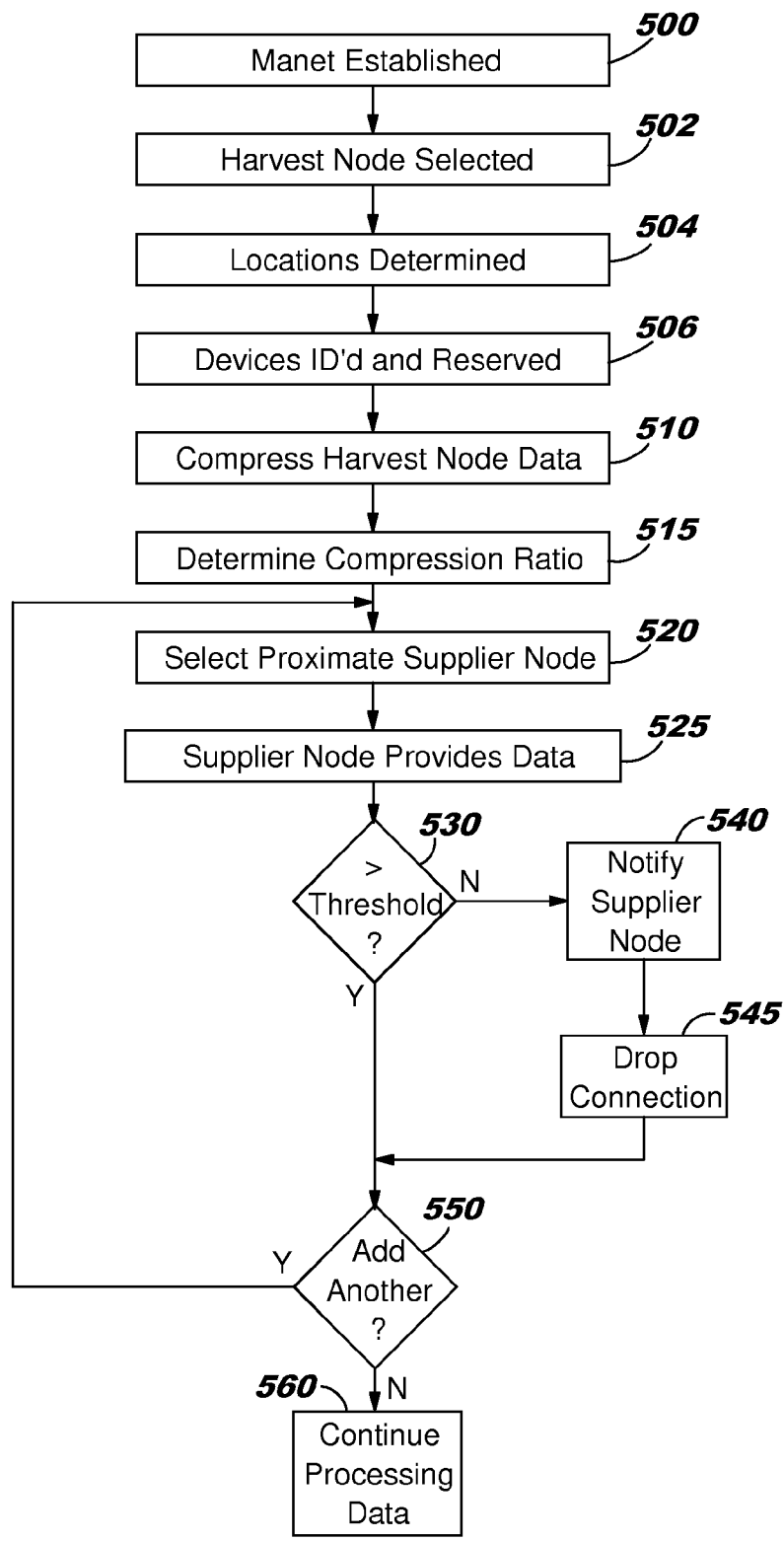
FIG. 5 is a flow diagram of a harvest node uploading data from multiple mobile devices to a remote server in accordance with a first embodiment.

FIG. 5 is a flow diagram of a harvest node uploading data from multiple mobile devices to a repository in accordance with a first embodiment. This process can be implemented as data is being uploaded from multiple mobile devices or may be implemented prior to the uploading of data and then adjusted as data is uploaded or otherwise acquired. For ease of reference, discrete collections of data suitable for data compression such as image frames are referred to herein as bundles or blobs that are collected in sequence as a stream of data bundles, also known as a data stream. As described above, a harvest node is a mobile device which collects data from other mobile devices (i.e., supplier nodes) for uploading to a repository, which stores and possibly manages the uploaded data.

In a first step 500, a manet (mobile ad-hoc network) of proximate mobile devices is established. This manet may be established through a cellular, wireless network, or other type of communication network. The establishment of this manet can include exchanging security information to establish a secure connection. This manet may be spontaneously established by the mobile devices or it may be established at the request of a central device such as a repository. Alternatively, the manet may be established by the repository when that repository notices that many proximate mobile devices are uploading similar data which exceeds a similarity threshold. More than one manet may be established such as described above with reference to FIG. 4. Each of the mobile devices may be utilizing a common or similar application that was previously or concurrently downloaded to the mobile device. Such applications can include a common application program interface for improving communications between the mobile devices, including improving the sharing of data streams between the mobile devices.

Then in step 502, a harvest node is selected from the manet for uploading or otherwise transmitting data gather from a set of proximate mobile devices to the repository. See FIG. 8 below for steps on selecting a harvest node. The harvest node may be uploading data or not. Alternatively, the harvest node may have been selected prior to establishing the manet and utilized for establishing that manet.

In step 504, the locations of the other mobile devices in the manet are determined. These can be GPS (global positioning position) coordinates, the relative location of each mobile device in the manet relative to the harvest node, or simply a measure of distance from the harvest node based on signal strength. This step is optional and may be utilized in some applications and not in other applications. This step may also be performed when the manet is established or at other times within this process. Then in step 506, the mobile devices within the manet that are not a harvest node are identified and reserved as potential proximate supplier nodes within the manet. That is, if a mobile device is potentially within two manets, it may be reserved as being within one of those manets based on its relative location and proximity to the harvest nodes. This can be changed based on data similarity as described below.

Subsequently in step 510, harvest node begins the process of compressing a data bundle captured by the harvest node. Many types of data compression can be utilized and can vary based on the type of data collected and any user requirements for that data. For example, this compression can be lossless or lossy. The type of compression can vary depending on circumstances. That is, one type of data compression may be utilized for a period of time until it is determined that another type of compression would be more effective given variations in the data or type of data being compressed. One form of data compression is sampling where redundant data is discarded as a form of compression rather than just compressing that data. Then in step 515, a harvest node compression ratio is determined. That is, the amount of data to be compressed is compared to the compressed data to determine the effectiveness of the data compression. This compression ratio can be stored in memory with an identifier of the harvest node. This compression ratio will be set as the prior compression ratio, which is useful as described below. If the harvest node is not collecting data, then steps 510-515 may be skipped and the prior compression ratio set to zero.

Then in step 520, a proximate supplier node is selected and contacted for supplying a data bundle or a stream of data bundles that may be similar to the harvest node data stream. The proximate supplier node is a mobile device which is generally most proximate (based on a nearness criterion) to the harvest node. Most proximate may be the closest mobile device to the harvest node, although other measures may be utilized. For example, when capturing auditory data, a mobile device directly behind the harvest node may have a more similar data captured than a mobile device adjoining or otherwise beside the harvest node due to data stream similarity. As a result, the mobile device behind the harvest node may be contacted first even though that mobile device may be slightly further away from the harvest node that the adjoining mobile device. Data stream similarity is when two or more data streams share some common types of data such that both (or more) data streams compressed together provide for greater data compression than the data streams compressed separately or when the data combined into one signal lowers overall bandwidth requirements for the cellular tower or other network handling the signal. The decision of which mobile device to contact first may be determined by the harvest node or by the remote server. Alternative embodiments may select and contact proximate supplier nodes based on other factors such as trust criteria or historical data such as prior successful joint data compression.

The proximate supplier node then provides a data bundle or stream of data bundles to the harvest node in step 525. Then in step 530, the harvest node compares the proximate supplier node data stream to the current harvest node data stream (which can include data streams from other proximate supplier nodes) for similarity. That is, a determination is made whether the proximate supplier node data stream is more similar than a threshold which may have been previously supplied. For example, the harvest node data stream and the supplier node data stream may both be auditory data, but one data stream may be in one format and the other data stream may be in a different format. Whether these data streams are sufficiently similar will be based on the provided threshold. That threshold may be based on factors such as the amount of processing power required to combine and compress the data streams or other factors such as applicability of those data streams to a common application or not. If no in step 530, then processing continues to step 540, otherwise processing continues to step 550.

In step 540 (a predetermined threshold has not been met), the previously selected proximate supplier node is notified that that mobile devices' data will not be collected and combined with the harvest node data. Then in step 545, the connection with the previously selected supplier node is dropped, allowing that supplier node to connect with another harvest node through another manet. Optionally, the connection may be retained in case conditions should change. Processing continues to step 550.

In step 550, it is determined whether the harvest node has bandwidth and processing power needed to add another supplier node, which may extend the manet. The compression ratio may be utilized in making this determination. If yes, then processing returns to step 520 (unless all proximate supplier nodes have been contacted), otherwise processing continues to step 560.

In step 560, processing continues for collecting, combining, compressing and uploading data streams by the harvest node with the previously selected harvest nodes. This can continue until the supplier nodes cease providing data bundles (data streams), until the data similarity for any proximate supplier node drops below the predetermined threshold, or until other predetermined conditions. Depending upon the cause, the harvest node can drop and add supplier nodes as needed so long as the predetermined thresholds and conditions are met.

In the first embodiment, the threshold for data similarity is mainly based on the type of data being compressed. However, other types of thresholds and data similarity may be utilized. For example, in the second and third embodiments described below, the threshold is based on joint data compression success. That is, if adding additional proximate supplier node data stream keeps data compression within a threshold, additional nodes may be added.

Figure 6:
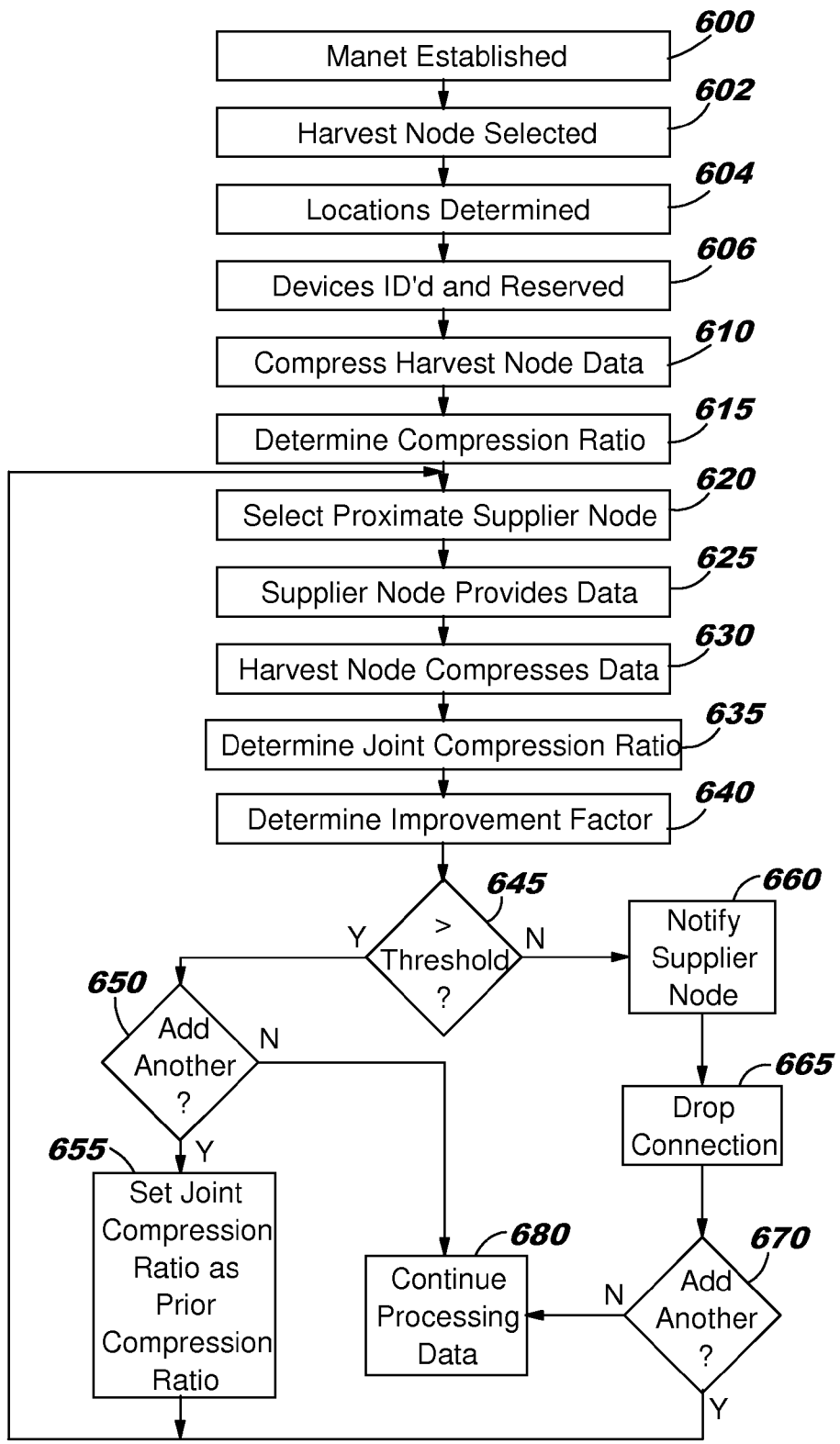
FIG. 6 is a flow diagram of a harvest node uploading data from multiple mobile devices to a repository in accordance with a second embodiment.

FIG. 6 is a flow diagram of a harvest node uploading data from multiple mobile devices to a repository in accordance with a second embodiment. This process can be implemented as data is being uploaded from multiple mobile devices or may be implemented prior to the uploading of data and then adjusted as data is uploaded or otherwise acquired. For ease of reference, discrete collections of data suitable for data compression such as image frames are referred to herein as bundles or blobs that are collected in sequence as a stream of data bundles, also known as a data stream. As described above, a harvest node is a mobile device which collects data from other mobile devices (i.e., supplier nodes) for uploading to a repository, which stores and possibly manages the uploaded data.

In a first step 600, a manet (mobile ad-hoc network) of proximate mobile devices is established. This manet may be established through a cellular, wireless network, or other type of communication network. The establishment of this manet can include exchanging security information to establish a secure connection. This manet may be spontaneously established by the mobile devices or it may be established at the request of a central device such as a repository. Alternatively, the manet may be established by the repository when that repository notices that many proximate mobile devices are uploading similar data whose similarity exceeds a threshold. More than one manet may be established such as described above with reference to FIG. 4. Each of the mobile devices may be utilizing a common or similar application that was previously or concurrently downloaded to the mobile device. Such applications can include a common application program interface for improving communications between the mobile devices, including improving the sharing of data streams between the mobile devices.

Then in step 602, a harvest node is selected from the manet for uploading or otherwise transmitting data gather from a set of proximate mobile devices to the repository. See FIG. 8 below for steps on selecting a harvest node. The harvest node may be uploading data or not. Alternatively, the harvest node may have been selected prior to establishing the manet and utilized for establishing that manet.

In step 604, the locations of the other mobile devices in the manet are determined. These can be GPS (global positioning position) coordinates, the relative location of each mobile device in the manet relative to the harvest node, or simply a measure of distance from the harvest node based on signal strength. This step is optional and may be utilized in some applications and not in other applications. This step may also be performed when the manet is established or at other times within this process. Then in step 606, the mobile devices within the manet that are not a harvest node are identified and reserved as potential proximate supplier nodes within the manet. That is, if a mobile device is potentially within two manets, it may be reserved as being within one of those manets based on its relative location and proximity to the harvest nodes. This can be changed based on data similarity as described below.

Subsequently in step 610, harvest node begins the process of compressing a data bundle captured by the harvest node. Many types of data compression can be utilized and can vary based on the type of data collected and any user requirements for that data. For example, this compression can be lossless or lossy. The type of compression can vary depending on circumstances. That is, one type of data compression may be utilized for a period of time until it is determined that another type of compression would be more effective given variations in the data or type of data being compressed. One form of data compression is sampling where redundant data is discarded as a form of compression rather than just compressing that data. Then in step 615, a harvest node compression ratio is determined. That is, the amount of data to be compressed is compared to the compressed data to determine the effectiveness of the data compression. This compression ratio can be stored in memory with an identifier of the harvest node. This compression ratio will be set as the prior compression ratio, which is useful as described below. If the harvest node is not collecting data, then steps 610-615 may be skipped and the prior compression ratio set to zero.

Then in step 620, a proximate supplier node is selected and contacted for supplying a data bundle or a stream of data bundles that are similar to the harvest node data stream. The proximate supplier node is a mobile device which is generally most proximate (based on a nearness criterion) to the harvest node. Most proximate may be the closest mobile device to the harvest node, although other measures may be utilized. For example, when capturing video data, a mobile device directly behind the harvest node may have a more similar image captured than a mobile device adjoining or otherwise beside the harvest node due to data stream similarity. As a result, the mobile device behind the harvest node may be contacted first even though that mobile device may be slightly further away from the harvest node that the adjoining mobile device. Data stream similarity is when two or more data streams share some common data such that both (or more) data streams compressed together provide for greater data compression than the data streams compressed separately. The decision of which mobile device to contact first may be determined by the harvest node or by the remote server. Alternative embodiments may select and contact proximate supplier nodes based on other factors such as trust criteria or historical data such as prior successful joint data compression.

The proximate supplier node then provides a data bundle or stream of data bundles to the harvest node in step 625. Then in step 630, the harvest node compresses the data bundle(s) from the supplier node data with the data bundle(s) captured by the harvest node. This compression can be accomplished through a variety of techniques depending on the type of data and any user requirements. For example, a harvest node data bundle may be overlaid by the supplier node bundle and compressed together. However, such an approach may make it more difficult to separate the data bundles later. For another example, the supplier node bundle may be compared to the harvest node bundle and any differences (or similarities) identified with the differences (or similarities) being compressed. With the use of a small header or other techniques, the supplier node data bundle could be easily separated from the harvest node bundle later. Other types of user requirements for selecting nodes for combining data bundles could be implemented such a security requirements (e.g., encryption). Then in step 635, a joint compression ratio is determined. That is, the amount of data to be compressed from the harvest and supplier nodes is compared to the uncompressed data of step 630 to determine the effectiveness of the joint data compression. This ratio can be dynamic due to variations in the underlying data being compressed.

In step 640, the joint compression ratio is compared to the prior compression ratio to determine a joint compression success factor, also referred to as an improvement factor. This improvement factor can be an absolute number such as by subtracting the prior compression ratio from the joint compression ratio, or can be an improvement compression ratio if the joint compression ratio is divided by the prior compression ratio. Alternative embodiments may utilize other factors for comparison purposes. Then in step 645, it is determined whether the improvement factor exceeds a predetermined threshold. The threshold can be a positive number or zero, thereby requiring that any additional supplier node improves or maintains overall data compression. The threshold can also be a small negative number so that the addition of a supplier node does not significantly affect overall data compression. The threshold can also be dynamic to take into account the dynamic nature of the underlying data and resulting variations on the joint compression ratio. That is, the threshold ratio may allow variations in compressions for predetermined periods of time before more strictly enforcing the threshold ratio. If yes in step 645, the processing continues to step 650, otherwise processing continues to step 660.

In step 650 (a predetermined threshold has been met), it is determined whether the harvest node has bandwidth and processing power needed to add another supplier node, thereby extending the manet. If yes, then processing continues to step 655, otherwise processing continues to step 680. In step 655, the joint compression ratio is set as the prior compression ratio and processing returns to step 620 to add another supplier node. In step 660 (a predetermined threshold has not been met), the previously selected supplier node is notified that that mobile devices' data will not be collected and combined with the harvest node data. Then in step 665, the connection with the previously selected supplier node is dropped. Optionally, the connection may be retained in case conditions should change. In step 670, it is determined whether additional supplier nodes may be selected. That is, it is determined whether any additional supplier nodes within range of the harvest node are promising candidates for collecting and combining their data streams with the harvest node. If there are not any more promising candidates, then processing continues to step 680, otherwise processing returns to step 655.

In step 680, processing continues for collecting, combining, compressing and uploading data streams by the harvest node with the previously selected harvest nodes. This can continue until the supplier nodes cease providing data bundles (data streams), until the improvement factor drops below another predetermined threshold, or until other predetermined conditions. Depending upon the cause, the harvest node can drop and add supplier nodes as needed so long as certain predetermined thresholds are met. For example, if one or more proximate supplier nodes changes its view angle in a video, there would be less video similarity between mobile devices, thereby dropping the compression ratio. If that drop in compression ratio exceeds a threshold, that proximate supplier node may be dropped by the harvest node and another proximate supplier node may be added as a result.

The second embodiment could include data privacy and data encryption as part of the compression process. For example, supplier node data may be sent to a harvest node unencrypted but with security requirements in place with the harvest node to protect the privacy of the supplier node data at the harvest node. The harvest node can then jointly compress the harvest node data utilizing the unencrypted supplier node data, then encrypt the resulting compressed data for upload to the server repository. This process protects the privacy of both supplier node and harvest node data. Other embodiments may allow the supplier node to encrypt its data prior to shipment to the harvest node while the harvest node also uses similar encryption of its data before jointly compressing the data. With an appropriate selection of encryption, the harvest node may be able to take advantage of data similarity between the data streams to take advantage of joint compression even though both data streams are encrypted prior to data encryption. Other alternative embodiments using data privacy and data encryption may be utilized.

Figure 7:
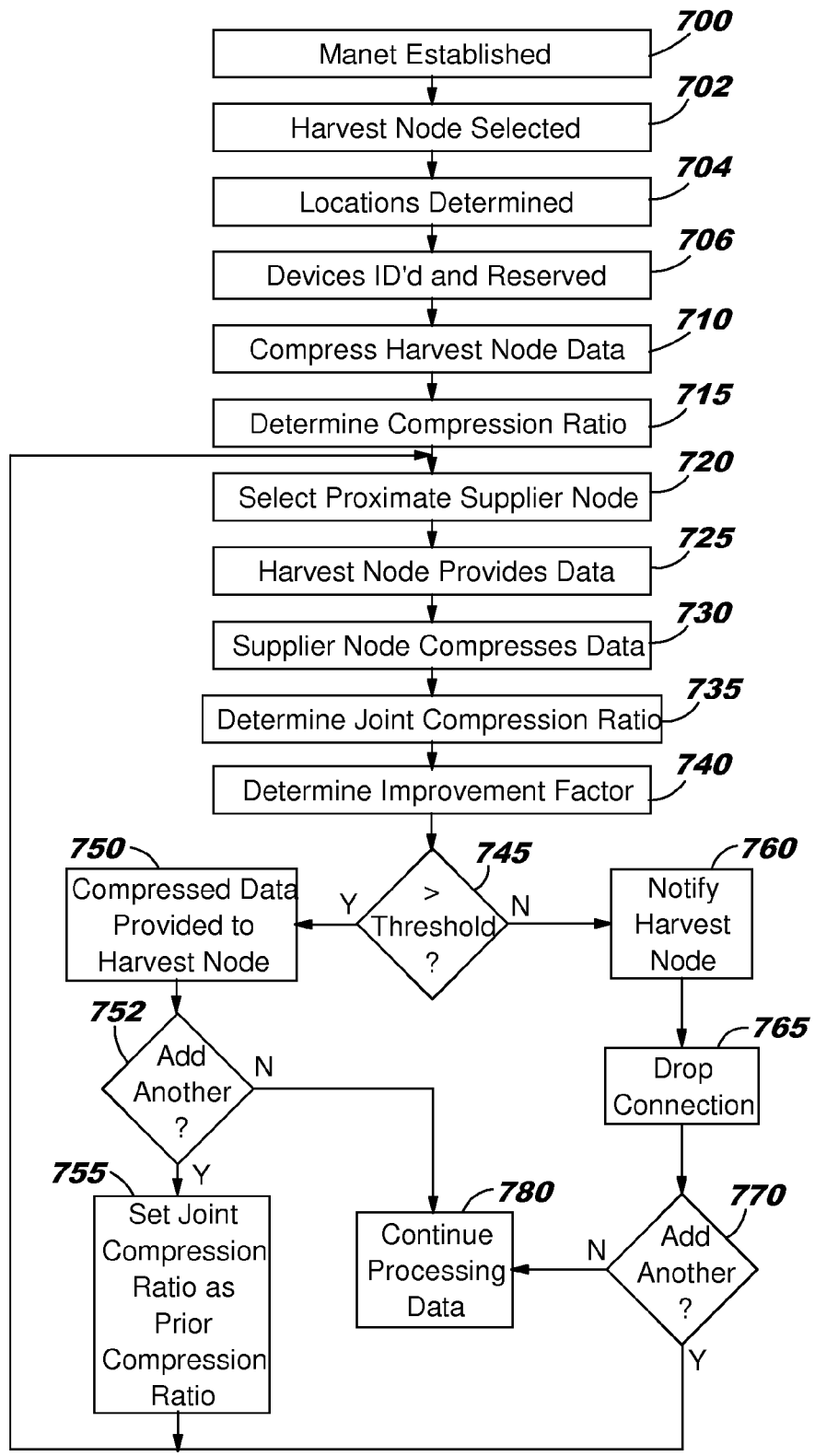
FIG. 7 is a flow diagram of a harvest node uploading data from multiple mobile devices to a repository in accordance with a third embodiment.

FIG. 7 is a flow diagram of a harvest node uploading data from multiple mobile devices to a repository in accordance with a third embodiment. This process can be implemented as data is being uploaded from multiple mobile devices or may be implemented prior to the uploading of data and then adjusted as data is uploaded or otherwise acquired. For ease of reference, discrete collections of data suitable for data compression such as image frames are referred to herein as bundles or blobs that are collected in sequence as a stream of data bundles, also known as a data stream. As described above, a harvest node is a mobile device which collects data from other mobile devices (i.e., supplier nodes) for uploading to a repository, which stores and possibly manages the uploaded data.

In a first step 700, a manet (mobile ad-hoc network) of proximate mobile devices is established. This manet may be established through a cellular, wireless network, or other type of communication network. The establishment of this manet can include exchanging security information to establish a secure connection. This manet may be spontaneously established by the mobile devices or it may be established at the request of a central device such as a repository. Alternatively, the manet may be established by the repository when that repository notices that many proximate mobile devices are uploading similar data whose similarity exceeds a threshold. More than one manet may be established such as described above with reference to FIG. 4. Each of the mobile devices may be utilizing a common or similar application that was previously or concurrently downloaded to the mobile device. Such applications can include a common application program interface for improving communications between the mobile devices, including improving the sharing of data streams between the mobile devices.

Then in step 702, a harvest node is selected from the manet for uploading or otherwise transmitting data gather from a set of proximate mobile devices to the repository. See FIG. 8 below for steps on selecting a harvest node. The harvest node may be uploading data or not. Alternatively, the harvest node may have been selected prior to establishing the manet and utilized for establishing that manet.

In step 704, the locations of the other mobile devices in the manet are determined. These can be GPS (global positioning position) coordinates, the relative location of each mobile device in the manet relative to the harvest node, or simply a measure of distance from the harvest node based on signal strength. This step is optional and may be utilized in some applications and not in other applications. This step may also be performed when the manet is established or at other times within this process. Then in step 706, the mobile devices within the manet that are not a harvest node are identified and reserved as potential proximate supplier nodes within the manet. That is, if a mobile device is potentially within two manets, it may be reserved as being within one of those manets based on its relative location and proximity to the harvest nodes. This can be changed based on data similarity as described below.

Subsequently in step 710, harvest node begins the process of compressing a data bundle captured by the harvest node. Many types of data compression can be utilized and can vary based on the type of data collected and any user requirements for that data. For example, this compression can be lossless or lossy. The type of compression can vary depending on circumstances. That is, one type of data compression may be utilized for a period of time until it is determined that another type of compression would be more effective given variations in the data or type of data being compressed. One form of data compression is sampling where redundant data is discarded as a form of compression rather than just compressing that data. Then in step 715, a harvest node compression ratio is determined. That is, the amount of data to be compressed is compared to the compressed data to determine the effectiveness of the data compression. This compression ratio can be stored in memory with an identifier of the harvest node. This compression ratio will be set as the prior compression ratio, which is useful as described below. If the harvest node is not collecting data, then steps 710-715 may be skipped and the prior compression ratio set to zero.

Then in step 720, a proximate supplier node is selected and contacted for supplying a compressed data bundle or a compressed stream of data bundles that are similar to the harvest node data stream. The proximate supplier node is a mobile device which is generally most proximate (based on a nearness criterion) to the harvest node. Most proximate may be the closest mobile device to the harvest node, although other measures may be utilized. For example, when capturing video data, a mobile device directly behind the harvest node may have a more similar image captured than a mobile device adjoining or otherwise beside the harvest node. As a result, the mobile device behind the harvest node may be contacted first due to data stream similarity even though that mobile device may be slightly further away from the harvest node that the adjoining mobile device. Data stream similarity is when two or more data streams share some common data such that both (or more) data streams compressed together provide for greater data compression than the data streams compressed separately. The decision of which mobile device to contact first may be determined by the harvest node or by the remote server. Alternative embodiments may select and contact proximate supplier nodes based on other factors such as trust criteria or historical data such as prior successful joint data compression.

The proximate supplier node then is then provided a data bundle or stream of data bundles captured by the harvest node in step 725 as well as the prior data compression ratio. Then in step 730, the supplier node compresses the data bundle(s) received from the harvest node with the data bundle(s) captured by the supplier node. This compression can be accomplished through a variety of techniques depending on the type of data and any user requirements. For example, a captured supplier node data bundle may be overlaid by the received harvest node bundle and compressed together. However, such an approach may make it more difficult to separate the data bundles later. For another example, the supplier node bundle may be compared to the harvest node bundle and any differences (or similarities) identified with the differences (or similarities) being compressed. With the use of a small header or other techniques, the supplier node data bundle could be easily separated from the harvest node bundle later. Other types of user requirements for selecting nodes for combining data bundles could be implemented such a security requirements (e.g., encryption). Then in step 735, a joint compression ratio is determined by the supplier node compressing that data. That is, the amount of data to be compressed from the harvest and supplier nodes is compared to the uncompressed data of step 730 to determine the effectiveness of the joint data compression. This ratio can be dynamic due to variations in the underlying data being compressed.

In step 740, the joint compression ratio is compared by the supplier node to the prior compression ratio to determine a joint compression success factor, also referred to as an improvement factor. This improvement factor can be an absolute number such as by subtracting the prior compression ratio from the joint compression ratio, or it can be an improvement compression ratio if the joint compression ratio is divided by the prior compression ratio. Alternative embodiments may utilize other factors for comparison purposes. Then in step 745, it is determined whether the improvement factor exceeds a predetermined threshold. The threshold can be a positive number or zero, thereby requiring that any additional supplier node improves or maintains overall data compression. The threshold can also be a small negative number so that the addition of a supplier node does not significantly affect overall data compression. The threshold can also be dynamic to take into account the dynamic nature of the underlying data and resulting variations on the joint compression ratio. That is, the threshold ratio may allow variations in compressions for predetermined periods of time before more strictly enforcing the threshold ratio. If yes in step 745, the processing continues to step 750, otherwise processing continues to step 760. In an alternative embodiment, the harvest node may provide a compression threshold instead of a prior compression ratio in step 725, and then the supplier node compares the joint compression ratio to the compression threshold in step 745.

In step 750 (a predetermined threshold has been met), then the supplier node provides the compressed supplier node data to the harvest node for uploading as well as the joint compression ratio. This process of the harvest node sending data bundles to the supplier node, the supplier node compressing the supplier node data against the harvest node data, then sending the compressed supplier node data to the harvest node for uploading can continue until either data stream is discontinued or until the joint compression ratio falls below a desired compression ratio for a predetermined period of time.

In the meantime, in step 752, it is determined whether the harvest node has bandwidth and processing power needed to add another supplier node, thereby extending the manet. If yes, then processing continues to step 755, otherwise processing continues to step 780. In step 755, the joint compression ratio is set as the prior compression ratio and processing returns to step 720 to add another supplier node. In step 760 (a predetermined threshold has not been met), the previously selected supplier node notifies the harvest node that that the supplier node's data will not be collected and combined with the harvest node data. Then in step 765, the connection with the previously selected supplier node is dropped. Optionally, the connection may be retained in case conditions should change. In step 770, it is determined whether additional supplier nodes may be selected. That is, it is determined whether any additional supplier nodes within range of the harvest node are promising candidates for collecting and combining their data streams with the harvest node. If there are not any more promising candidates, then processing continues to step 780, otherwise processing returns to step 755.

In step 780, processing continues for collecting, combining, compressing and uploading data streams by the harvest node with the previously selected harvest nodes. This can continue until the supplier nodes cease providing data bundles (data streams), until the improvement factor drops below another predetermined threshold, or until other predetermined conditions. Depending upon the cause, the harvest node can drop and add supplier nodes as needed so long as certain predetermined thresholds are met. For example, if one or more proximate supplier nodes changes its view angle in a video, there would be less video similarity between mobile devices, thereby dropping the compression ratio. If that drop in compression ratio exceeds a threshold, that proximate supplier node may be dropped by the harvest node and another proximate supplier node may be added as a result.

The third embodiment could include data privacy and data encryption as part of the compression process. For example, harvest node data may be sent to a supplier node unencrypted but with security requirements in place with the supplier node to protect the privacy of the harvest node data at the supplier node. The supplier node can then jointly compress the supplier node data utilizing the unencrypted harvest node data, then encrypt the resulting compressed data for transmission to the harvest node and subsequent upload to the server repository. This process protects the privacy of both harvest node and supplier node data. Other embodiments may allow the harvest node to encrypt its data prior to shipment to the supplier node while the supplier node also uses similar encryption of its data before jointly compressing the data. With an appropriate selection of encryption, the supplier node may be able to take advantage of data similarity between the data streams to take advantage of joint compression even though both data streams are encrypted prior to data encryption. Other alternative embodiments using data privacy and data encryption may be utilized.

Many alternative embodiments may be implemented whereby combinations of the first, second and third embodiments may be utilized. For example, a harvest node may jointly compress data from several supplier nodes where come of the supplier nodes are also acting as harvest nodes compressing data from other supplier nodes. For another example, a supplier node not capturing data for upload may be utilized by a harvest node for handling some of the data processing load. Many other types of combinations can be implemented utilizing these and other embodiments.

Figure 8:
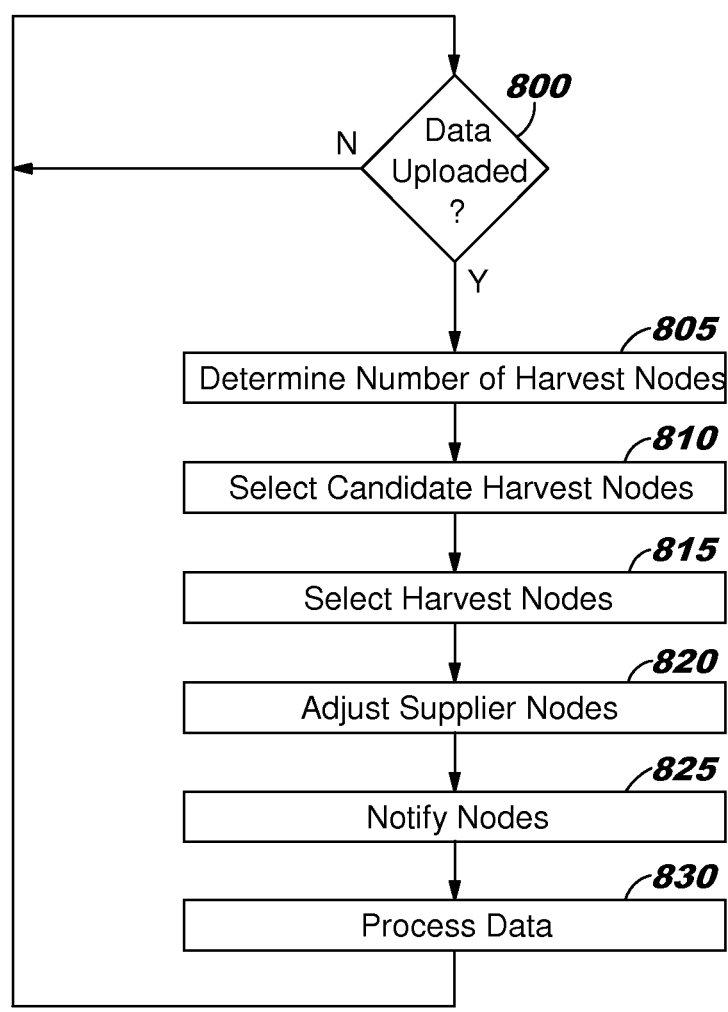
FIG. 8 is a flow diagram of harvest nodes being selected in which various embodiments may be implemented.

FIG. 8 is a flow diagram of harvest nodes being selected in which various embodiments may be implemented. This process can be implemented whenever multiple mobile devices uploading data are detected in close proximity with each other. Rather than having multiple devices uploading data concurrently, thereby putting a large load on communication bandwidth, the same data can be acquired utilizing selected mobile devices as harvest nodes. These harvest nodes can take advantage of data similarity between proximate mobile device uploads to improve data compression and reduce overall bandwidth demands.

In a first step 800, it is determined whether multiple mobile devices in close proximity (a nearness criteria) are starting to upload similar data. If no, then processing returns to step 800 to repeat that determination, otherwise processing continues to step 805. This determination can be initiated whenever a cell or other identifiable geographic area shows an increase in data traffic indicating that substantial parallel data uploading is being performed. The proximity of the mobile devices may be checked, such as through checking the GPS (global positioning system) location or other location indicator of each mobile device in that cell. The mobile devices may also check proximity by contacting each other through near field communications, such as through a previously established mobile ad-hoc network (manet), or other types of detection. The data being uploaded may be briefly compared for similarity. For example, the data may all be video data with similar information indicating that the data is similar enough for joint data compression.

In step 805, a number of desired harvest nodes can be determined. For example, if there are 100 mobile devices in proximity uploading similar types of data, then a number of harvest nodes may be determined from historical data of similar data being acquired in the past. In this case, the number of harvest nodes may be initially set for 10 based on historical data suggesting that each harvest node should handle data acquired from on average 10 supplier node mobile devices. Alternative embodiments may utilize other factors such as the average density of the mobile devices. That is, the more closely packed the mobile devices are, the more similar the data being uploaded resulting in better compression of that data. In addition, historical data may reflect that a harvest node can handle a maximum of 14 supplier nodes for this type of data, so that 10 is a reasonable number given that maximum.

Then in step 810, candidate mobile devices are selected as potential harvest nodes. For example, some mobile devices may be older devices and not capable of being a harvest node. In addition, some mobile devices may have low batteries so that they cannot act as a harvest node with the processing demands that comes with that function. Furthermore, some devices may not have the security requirements or owner approval for acting as a harvest node. Security requirements can include provisions for protecting the confidentiality or ownership of data provided by the supplier nodes to the harvest node. Other factors can be taken into consideration in identifying potential harvest nodes.

Subsequently in step 815, the clustering of mobile devices based on location and proximity is utilized to select harvest nodes for acquiring data. That is, if a cluster of mobile devices is identified with one or more potential harvest nodes, then one or more of the centrally located mobile devices in that cluster is selected as a harvest node. Each cluster may be identified by a radius from a potential harvest node or other technique. If clustering is not sufficient or in the alternative, then other techniques may be utilized for selecting harvest nodes from the potential harvest nodes. For example, each potential harvest node may query proximate mobile devices within a certain radius to determine a joint compression ratio(s) based on the data being provided by the proximate mobile devices. This joint compression ratio is accompanied with a list of mobile devices being included in generating that joint compression ratio. The compression results from the potential harvest nodes can then be utilized to select the harvest nodes to acquire data. Please note that the techniques described above with reference to FIGS. 5, 6 and 7 may be utilized to generate a manet and to generate joint compression ratios.

Then in step 820, adjustments may be made to the set of supplier nodes that each harvest node handles to avoid overlap and to improve compression ratios. For example, a radius for selecting supplier nodes may be reduced or other techniques utilized. Finally, in step 825 the selected mobile devices are then notified of their status as a harvest node including the list of mobile devices to be included as supplier nodes for that harvest node. Processing then continues in step 830 with the acquisition of data utilizing these selected harvest nodes. This can include the splitting of acquired data by mobile device at the server for storage and for use by the owner of each node. This processing of data can continue until one or more mobile devices stop providing data, more mobile devices start uploading data from the area, mobile devices move relative to each other (which may necessitate linking a supplier node to a different harvest node), etc. When that occurs, processing can return to step 800.

Many alternative embodiments could be implemented. In this example, the process for identifying harvest nodes is reactive to multiple devices uploading data. In alternative embodiment, the process may be more proactive including contacting mobile devices not uploading data to act as harvest nodes. In addition, the embodiments described above with reference to FIGS. 5, 6 and 7 could be utilized for acquiring data.

Figure 9A:
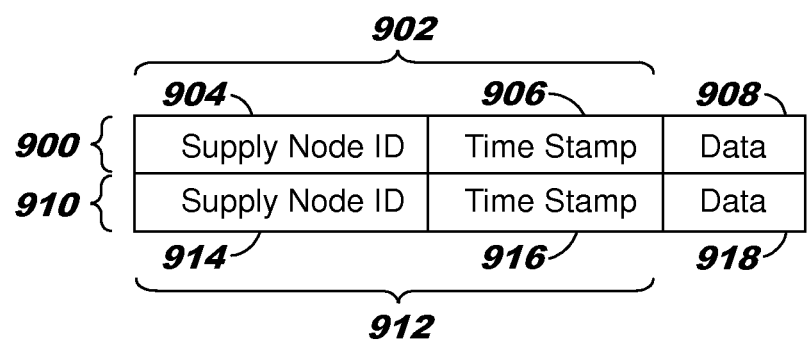
FIGS. 9A-9C are block diagrams of data structures in which various embodiments may be implemented.
Figure 9B:
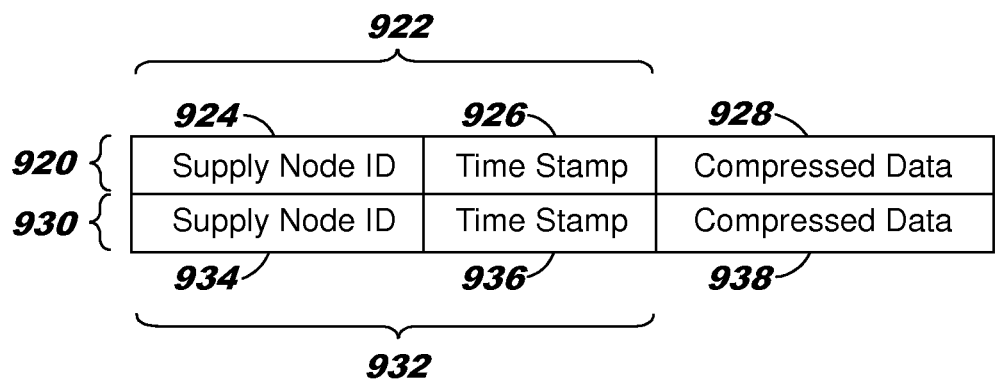
Figure 9C:
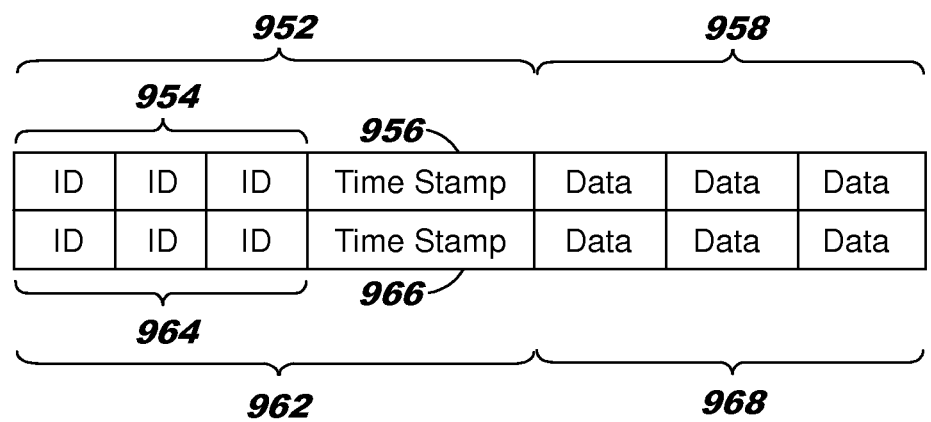

FIGS. 9A-9C are block diagrams of data structures in which various embodiments may be implemented. These block diagrams are examples of the types of data structures which may be utilized. Alternative embodiments may utilize different types of data structures depending on the type of data being provided, the type of communications being utilized, etc.

FIG. 9A illustrates a data structure which may be utilized by a supplier node sending two frames of data to a harvest node. A frame of data may be a video frame or other discrete unit of data sent by the supplier node to the harvest node as described above with reference to the second embodiment. Each frame of data is represented with a record of data 900 and 910. Record 900 includes a header 902 with an identifier 904 of the supplier node and a time stamp 906 of the data as well as data 908 of the first frame of data. Data 908 may be uncompressed or compressed. For example, multiple sequential pixels of black may be represented by a color descriptor and a number representing the number of sequential pixels with that color. Record 910 includes a header 912 with an identifier 914 of the supplier node and a time stamp 916 of the data as well as data 918 of the second frame of data. Data 918 may be uncompressed or compressed. For example, only differences between the first and second frame of data may be provided to reduce the amount of data needed to represent the second frame of data. Many other alternative forms of data structures or types of data compression may be utilized. Also, this same type of data structure may be utilized by the harvest node in sending frames of data to the supplier nodes as described above with reference to the third embodiment.

FIG. 9B illustrates a data structure which may be utilized by a supplier node sending two frames of fully compressed data to a harvest node. A frame of data may be a video frame or other discrete unit of data sent by the supplier node to the harvest node. These frames of data may already be compressed such as described above with reference to the third embodiment. Each frame of data is represented with a record of data 920 and 930. Record 920 includes a header 922 with an identifier 924 of the supplier node and a time stamp 926 of the data as well as data 928 of the first frame of data. Data 928 is fully compressed with reference to a corresponding frame of data from the harvest node. For example, only differences between the supplier node frame of data and the corresponding harvest node frame of data may be provided to reduce the amount of data needed to represent the first frame of data. Record 930 includes a header 932 with an identifier 934 of the supplier node and a time stamp 936 of the data as well as data 938 fully compressed with reference to a corresponding frame of data from the harvest node. For example, only differences between the supplier node frame of data and the corresponding harvest node frame of data may be provided to reduce the amount of data needed to represent the first frame of data. Many other alternative forms of data structures or types of data compression may be utilized.

FIG. 9C illustrates a data structure which may be utilized by a harvest node sending two frames of data from multiple supplier nodes as well as the harvest node to a remote server. A frame of data may be a video frame or other discrete unit of data sent by the supplier node to the harvest node. Each frame of data is compressed and represented with a record of data 950 and 960. Record 950 includes a header 952 with a set of identifiers 954 of the harvest node and the supplier nodes with a time stamp 956 of the first frame of data. Data 958 includes data from the harvest node and the supplier nodes for the first frame of data. Data 958 is fully compressed with reference to the compressed frame of data from the harvest node. For example, only differences between each supplier node frame of data and the corresponding harvest node frame of data may be provided to reduce the amount of data needed to represent the first frame of data. Record 960 includes a header 962 with a set of identifiers 964 of the harvest node and the supplier nodes with a time stamp 966 of the second frame of data. Data 968 includes data from the harvest node and the supplier nodes for the first frame of data. Data 968 is fully compressed with reference to the compressed frame of data from the harvest node. For example, only differences between the supplier node frame of data and the corresponding harvest node frame of data may be provided to reduce the amount of data needed to represent the first frame of data. Many other alternative forms of data structures or types of data compression may be utilized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for efficiently acquiring data from a plurality of proximate devices. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for efficiently acquiring data from a plurality of proximate mobile devices, the computer program product comprising a non-transitory computer readable storage medium having program instructions embodied therewith, the program instructions executable by a processing circuit to perform a method comprising:

creating a mobile ad-hoc network (manet) with a set of proximate mobile devices from the plurality of proximate mobile devices;

selecting a mobile device from the set of proximate mobile devices as a harvest node to transmit data gathered from the set of proximate mobile devices to a repository in a memory for storing the data;

responsive to detecting a first data stream and a second data stream from a respective first mobile device and a second mobile device from the set of proximate mobile devices, utilizing a processor to determine that jointly compressing data from the first and second data streams exceeds a compression threshold;

responsive to a positive determination that the compression threshold is exceeded, maintaining the first and second mobile devices in the manet compressing the first data stream and the second data stream to produce a jointly compressed data stream according to a first compression technique, wherein data from the first data stream and the second data stream are present in the jointly compressed data stream; and transmitting the jointly compressed data stream to the repository through the harvest node.

2. The computer program product of claim 1 further comprising selecting the set of proximate mobile devices from the plurality of proximate mobile devices based on a nearness criterion to the harvest node.

3. The computer program product of claim 1 further comprising selecting additional data streams from mobile devices among the set of proximate mobile devices based on a similarity of the additional data streams to the first and the second data streams.

4. The computer program product of claim 1 further comprising selecting the mobile device to be the harvest node based on a trust criterion and encrypting the first data stream and the second data stream.

5. The computer program product of claim 1 further comprising adding additional mobile devices from the plurality of proximate mobile devices to the set of proximate mobile devices in the manet based on a compression technique compressing any additional data streams with the first and second data streams with a compression efficiency exceeding the compression threshold.

6. The computer program product of claim 5 wherein the compression threshold is dynamic to take into account variations in the first, second and additional data streams.

7. The computer program product of claim 1 wherein the harvest node is used to compress the first and second data stream.

8. The computer program product of claim 1 wherein the manet is created responsive to a data request for data from mobile devices proximate to an event.

9. A data processing system for efficiently acquiring data from a plurality of proximate mobile devices, the data processing system comprising:
a processor; and
a memory storing program instructions which when executed by the processor execute the steps of:

creating a mobile ad-hoc network (manet) with a set of proximate mobile devices from the plurality of proximate mobile devices;

selecting a mobile device from the set of proximate mobile devices as a harvest node to transmit data gathered from the set of proximate mobile devices to a repository in the memory for storing the data;

responsive to detecting a first data stream and a second data stream from a respective first mobile device and a second mobile device from the set of proximate mobile devices, utilizing the processor to determine that jointly compressing data from the first and second data streams exceeds a compression threshold;

responsive to a positive determination that the compression threshold is exceeded, maintaining the first and second mobile devices in the manet compressing the first data stream and the second data stream to produce a jointly compressed data stream according to a first compression technique, wherein data from the first data stream and the second data stream are present in the jointly compressed data stream; and transmitting the jointly compressed data stream to the repository through the harvest node.

10. The data processing system of claim 9 further comprising selecting the set of proximate mobile devices from the plurality of proximate mobile devices based on a nearness criterion to the harvest node.

11. The data processing system of claim 9 further comprising selecting additional data streams from mobile devices among the set of proximate mobile devices based on a similarity of the additional data streams to the first and the second data streams.

12. The data processing system of claim 9 further comprising adding additional mobile devices from the plurality of proximate mobile devices to the set of proximate mobile devices in the manet based on a compression technique compressing any additional data streams with the first and second data streams with a compression efficiency exceeding the compression threshold.

13. The data processing system of claim 12 wherein the compression threshold is dynamic to take into account variations in the first, second and additional data streams.

14. The data processing system of claim 9 wherein the manet is created responsive to a data request for data from mobile devices proximate to an event.

* * * * *